United States Patent [19]

Hollow

[11] Patent Number: 4,996,521
[45] Date of Patent: Feb. 26, 1991

[54] INTRUSION DETERRENT APPARATUS

[76] Inventor: Thomas E. Hollow, 721 Brossard Dr., Thousand Oaks, Calif. 91360

[21] Appl. No.: 453,693

[22] Filed: Dec. 20, 1989

[51] Int. Cl.$^5$ .............................................. G08B 3/00
[52] U.S. Cl. .................... 340/691; 116/22 A; 222/61; 340/541; 340/573
[58] Field of Search .............. 340/691, 541, 555, 567, 340/573; 116/22 A; 52/101; 109/20, 29–34; 222/61

[56] References Cited

U.S. PATENT DOCUMENTS

| | | | |
|---|---|---|---|
| 3,436,882 | 4/1969 | Keefe | 52/101 |
| 3,656,141 | 4/1972 | Hill | 340/272 |
| 3,884,192 | 5/1975 | Knapp | 119/159 |
| 3,949,709 | 4/1976 | Myers | 119/159 |
| 3,991,688 | 11/1976 | Winters | 109/32 |
| 3,991,939 | 11/1976 | Maclay | 239/63 |
| 4,068,780 | 1/1978 | Fegley | 109/20 X |
| 4,107,660 | 8/1978 | Chleboun | 340/566 |
| 4,185,581 | 1/1980 | Tilton | 116/22 A |
| 4,308,911 | 1/1982 | Mandl | 165/22 |
| 4,503,399 | 3/1985 | Carr | 340/573 |
| 4,544,920 | 10/1985 | Hamlin | 340/565 |
| 4,636,774 | 1/1987 | Galvin et al. | 340/565 |
| 4,662,289 | 5/1987 | Harder | 109/33 X |
| 4,693,419 | 9/1987 | Weintraub et al. | 239/63 |
| 4,744,515 | 5/1988 | Watanabe | 239/70 |
| 4,852,802 | 8/1989 | Iggulden et al. | 239/64 |
| 4,867,076 | 9/1989 | Marcone | 109/20 |

*Primary Examiner*—Glen R. Swann, III
*Assistant Examiner*—Thomas J. Mullen, Jr.
*Attorney, Agent, or Firm*—Jack C. Munro

[57] ABSTRACT

An intrusion deterrent apparatus which activates a water spraying device in a specific area to prevent unauthorized activities within that area such as the application of graffiti. Connected with the water spraying device is a sensor that detects the presence of an animal. The water spraying device is to be activated for a preset period of time.

2 Claims, 2 Drawing Sheets

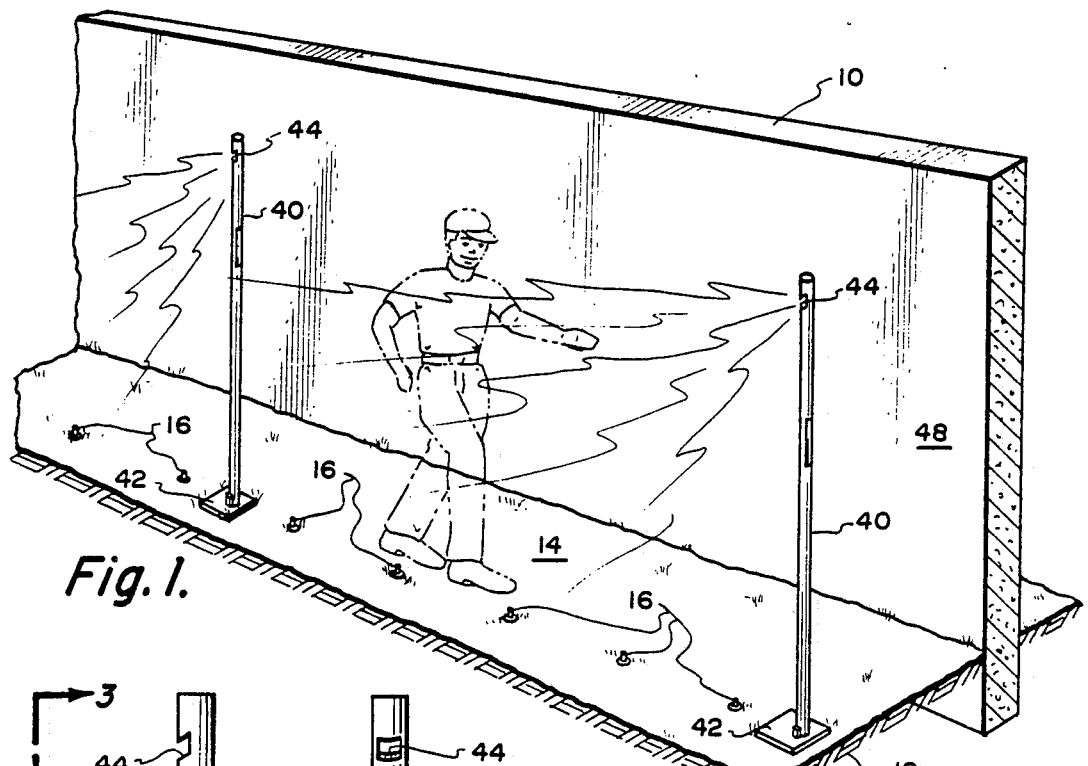
Fig. 1.
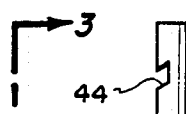
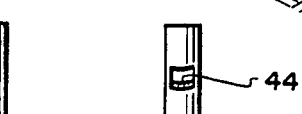
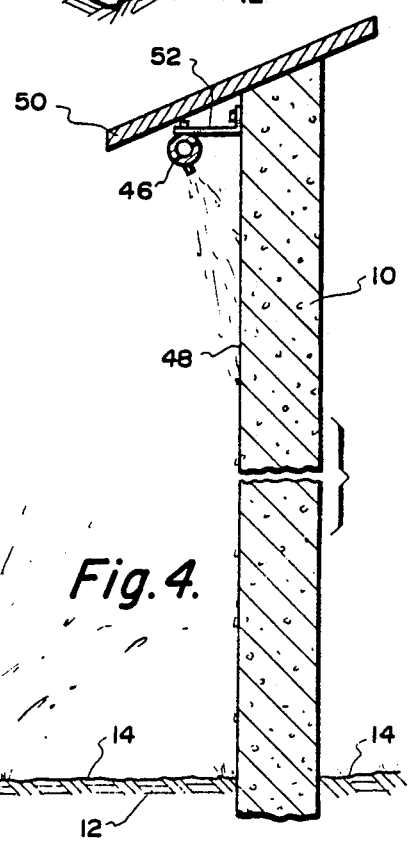
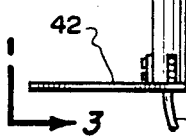
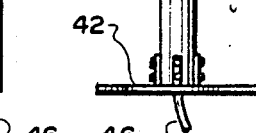
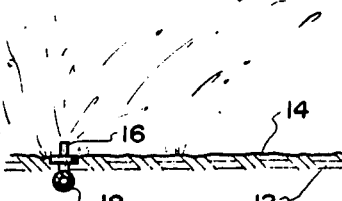
Fig.2.  Fig.3.  Fig.4.

INTRUSION DETERRENT APPARATUS

BACKGROUND OF THE INVENTION

The field of this invention relates to intrusion deterrent apparatuses and more particularly to an apparatus which will deter the presence of an animal such as a human being from performing an unauthorized activity in or on a given area.

Within the outdoors environments, there are many specific areas where unauthorized intrusion by animals is not desired. Common outdoor environmental areas would be walls, buildings, tunnels, bridges and other similar structures made by human beings. There is always a risk that these structures can be damaged not only by dogs and cats, but principally by human beings. A certain segment of the population have a strong need for writing and drawing on these structures. Generally, the writing and drawing is accomplished through the use of paint with spray paint cans being normally preferred. When these structures are constructed, the structures are generally made to have a desirable appearance. The application of one drawing and/or writing detracts from that appearance. Graffiti is a continuous big problem within any city, large or small.

At the present time, the only way to correct graffiti is after the fact. Once a structure has had graffiti applied to it, the municipality arranges to either have the graffiti erased or have the structure painted to cover by the graffiti. Either procedure is of significant expense to any municipality.

Although the structure of the present invention is designed primarily to deter the application of graffiti by human beings onto structures such as walls, sides of buildings and the like, it is certainly possible that the structure of the present invention can be utilized as a burglar deterrent or a deterrent for animals such as dogs and cats.

SUMMARY OF THE INVENTION

The structure of the present invention can either be manufactured to be usable in conjunction with previously installed equipment or can be manufactured as a complete unit to be installed within a given area. The previous installed equipment are usually irrigating sprinklers. A sensor is to be mounted at an appropriate elevated location from the ground and is designed to detect the presence of an animal within a specific area with this specific area being located directly adjacent the fixed structure that is to be protected. Once the presence is detected, the sensor activates through electrical circuitry the irrigating sprinklers located in this specific area. Because the human being is getting drenched, it is normally not conducive for that human being to continue to apply graffiti. Once the human being has left the specific area, the irrigating sprinklers will be deactivated. There may also be utilized a separate sprinkler system mounted on the fixed structure itself. It will be the designation of that sprinkler system to spray directly onto the fixed structure. The application of the "sheet of water" onto the fixed structure will almost make it impossible for anyone to apply graffiti to the fixed structure.

The primary objective of the present invention is to construct an apparatus which will effectively deter the application of graffiti to a fixed structure within almost any environment.

Another objective to the present invention is to construct an apparatus that deters the application of graffiti by utilizing pre-existing equipment such as previously installed irrigation systems.

Another objective of the present invention is to construct an apparatus which is to deter the application of graffiti to a fixed structure where it would be difficult for the person applying the graffiti to discover the presence of the apparatus.

Another objective to the present invention is to construct an apparatus to deter the application of graffiti which can be installed in a wide variety of different manners depending upon the requirement of a particular installation so therefore it is difficult for the graffiti applier to discover and deactivate the apparatus.

Another objective of the present invention is to construct an apparatus which deters the application of graffiti which is inexpensive to manufacture and therefore inexpensive to the ultimate consumer.

Another objective of the present invention is to construct a graffiti deterring apparatus which is relatively uncomplicated and can be quickly and easily installed by individuals of minimum technical ability.

BRIEF DESCRIPTION OF THE DRAWINGS

FIG. 1 is an isometric view showing a fixed structure such as a wall with the apparatus of the present invention being depicted mounted in conjunction with the wall;

FIG. 2 is a side view of a pole type of device within which is mounted a sensor utilized in conjunction with the apparatus of the present invention with the pole type of device to locate the sensor in an elevated position from the ground;

FIG. 3 is a front view of the pole type of device taken along line 3—3 of FIG. 2;

FIG. 4 is a side view of a wall depicting application of a ground mounted sprinkler system as well as a wall mounted sprinkler system.

DETAILED DESCRIPTION OF THE SHOWN EMBODIMENT

Figure 5:
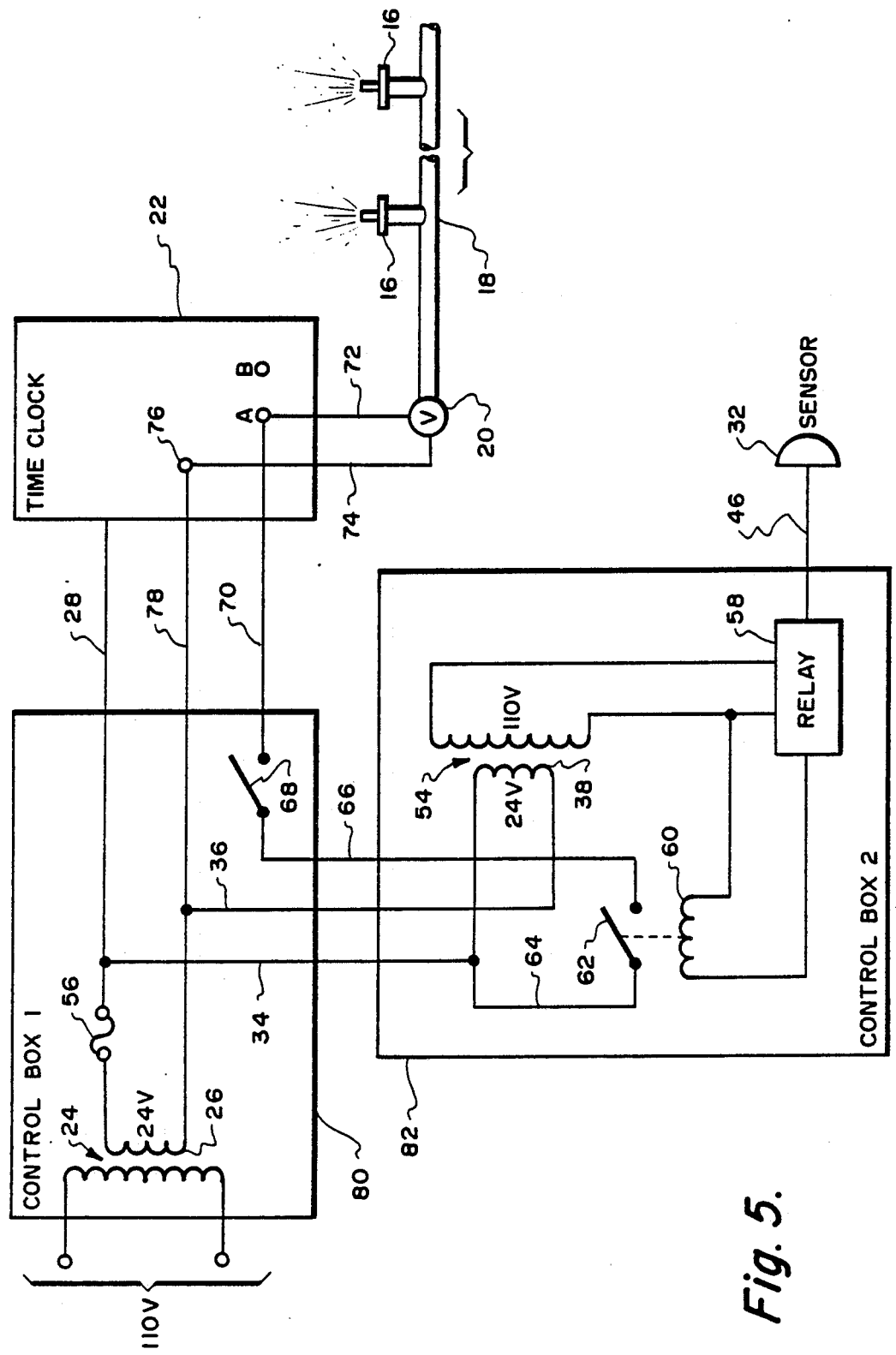
FIG. 5 is an electrical circuit diagram of the sensor circuit of the present invention.

Referring particularly to the drawings, there is depicted a vertical wall 10 located in an outdoors environment which is supported on ground 12. The ground 12 will normally comprise soil and has a landscaped area such as grass 14 on its upper surface. Within the ground 12 is mounted a series of irrigating sprinklers 16. The sprinklers 16 are connected together through a conduit 18 through which water is to be conducted to each sprinkler 16. It is to be understood that normally the water is to be supplied into the conduit 18 through a valve 20. The valve 20 is to be controlled electrically and will be activated at appropriate times by means of a time clock 22. The use of a valve 20 and a time clock 22 is deemed to be conventional.

The circuit is shown within FIG. 5 for operating of the valve 20. A conventional one hundred ten volt circuit is supplied to a transformer 24. From the transformer 24 there is produced a twenty-four volt circuit within coil 26 of the transformer 24. The coil 26 is connected by electrical connector 28 to the time clock 22. Twenty-four volts is also supplied through conductors 34 and 36 to a second coil 38. Coil 38 is part of a step-up transformer 54 between the coil 26 and the connection between conductors 28 and 34 is located a conventional fuse 56.

Coil 54 produces one hundred ten volts which is to be supplied to relay 58. Through relay 58 the one hundred ten volts is supplied through conductor 46 to the sensor 32. Relay 58 also includes a coil 60. Coil 60 functions to close switch 62. Switch 62 is electrically connected by conductor 64 to conductor 34. Closing of switch 62 supplies a signal through conductor 66 to manually operated switch 68. If manually operated switch 68 is closed, then the signal is transmitted through conductor 70 to position A of the item clock 22. A particular valve, such as valve 20, is to be connected to each position on the time clock 22 with only positions A and B being shown. It happens to be that valve 20 is shown connected to position A. It is to be understood that there will be a separate irrigation valve 20 that would be connected to position B. In all probability, the time clock 22 will include other positions which are not shown. It is normal that such time clocks 22 are capable of being connected to six or more irrigation valves.

When the time clock 22 is closed, which is to occur automatically at a preset time, the relay 58 is activated which produces a signal within coil 60 which closes switch 62. Let it be assumed that the manually operated switch 68 is in the closed position. As a result, valve 20 will be operated or moved to the open position which will permit water to flow through conduit 18 to be discharged through sprinkler heads 16.

Now let it be assumed that the preset time has not arrived and sensor 32 detects the presence of an animal. This causes the relay 58 again to be activated which again closes switch 62 and since switch 68 is closed, again, the valve 20 will be operated. Normally, this operation will be for a pre-established time such as a minute or two which can be operated by the use of some conventional timer mechanism either associated with the time clock 22 or separate from the time clock 22.

The valve 20 is electrically connected to position A through conductor 72. Also, the valve 20 is connected through conductors 74 to junction 76 of the time clock 22. Connection to junction 76 is connected by conductor 78 to the coil 26. It has been found to be preferable to include the coil 24, fuse 56 and switch 68 within a first control box 80. A second control box 82 includes switch 62, transformer 54, relay 58 and coil 60. Sensor 32 can take any of numerous forms and will normally be sensitive to either light or heat. The detection occurs by either there being a change in light or a change in heat with this change occurring due to motion. Such sensors are deemed to be conventional and well-known and are conventionally available. In most instances, the relay 58 will be de-activated since there will be no detection by the sensor 32.

The sensors 32 are to be mounted at some desired elevated location from the grass area 14 of the ground 12. A typical mounting would be through the use of a post 40 which is mounted on a platform 42 which is mounted on the grass area 14 of the ground 12. At the upper end of the post 40 is located an aperture 44. It is within the aperture 44 that the sensor 32 is positioned and is adapted to "look out" through the aperture 44. The electrical conductor 46 is conducted through the post 40 from the sensor 32 (directly adjacent the aperture 44) to the sensor control relay 30. It is to be noted that in actual practice that the aperture 44 will be located ten to twelve feet above the grass area 14. This height will make it difficult for a human being to negate the operation of the sensor 32. Typically negating of the operation would be by covering of the aperture 44. In actual practice, the post 40 may not be utilized but instead the sensor 32 may be mounted directly on the wall 10 or some other elevated location directly adjacent the wall 10. Actually, the location of the sensor 32 may be hidden to the point to where it is difficult to observe.

The aperture 44 is to be directed in the direction that is to be observed. In other words, the aperture 44 is to be aligned so that the sensor 32 will "look" in a direction parallel to the surface of the wall 10. It is noted in the drawing that there are two in number of the posts 40 being shown. However, it is to be understood that there could be utilized a single post 40 (therefore, single sensor 32), or there may be utilized a number of posts 40 greater than the two that are shown. The sensors 32 are constructed to be extremely sensitive and are capable of detecting the presence of an animal such as a human being up to one to two hundred feet away.

Not only can the ground irrigation sprinkler 16 be activated, there could also be activated a flooding sprinkler. The purpose of the flooding sprinkler valves 46 would be to spray or otherwise pour water directly onto the surface 48 of the wall 10. The flooding sprinklers 46 could be mounted under a coping 50 mounted on top of the wall 10. The mounting of the flooding sprinklers 46 would be by means of a bracket arrangement 52 which is attached directly to the surface of the wall 10.

What is claimed is:

1. In combination with a fixed structure, a specific area abutting and including said fixed structure, an intrusion deterrent apparatus mounted in close proximity to said fixed structure, said intrusion deterrent apparatus comprising:
   a spraying device capable of spraying water, said spraying device being located within said specific area, said specific area comprising ground, said spraying device comprising a sprinkler mounted on said ground; and
   a sensor for detecting the presence of an animal within said specific area, said sensor causing activation of said spraying device thereby encouraging the animal to leave said specific area.

2. The combination as defined in claim 1 wherein:
   said sensor being mounted in a spaced position from said ground to thereby make it difficult for a human being to gain unauthorized access to said sensor.

* * * * *